United States Patent
Yabuuchi

(10) Patent No.: US 11,290,607 B2
(45) Date of Patent: Mar. 29, 2022

(54) IMAGE READING APPARATUS, IMAGE FORMING APPARATUS, AND DOCUMENT AREA DETECTION METHOD

(71) Applicant: KYOCERA Document Solutions Inc., Osaka (JP)

(72) Inventor: Yasuyuki Yabuuchi, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 17/179,459

(22) Filed: Feb. 19, 2021

(65) Prior Publication Data

US 2021/0281698 A1 Sep. 9, 2021

(30) Foreign Application Priority Data

Feb. 26, 2020 (JP) .............................. JP2020-030083

(51) Int. Cl.
*H04N 1/04* (2006.01)
*H04N 1/00* (2006.01)

(52) U.S. Cl.
CPC ....... *H04N 1/00816* (2013.01); *H04N 1/0071* (2013.01); *H04N 1/00702* (2013.01); *H04N 1/00737* (2013.01)

(58) Field of Classification Search
CPC ........... H04N 1/00816; H04N 1/00702; H04N 1/0071; H04N 1/00737
See application file for complete search history.

(56) References Cited

U.S. PATENT DOCUMENTS

| | | | |
|---|---|---|---|
| 2003/0031363 A1* | 2/2003 | Liu | H04N 1/0402 382/173 |
| 2008/0100885 A1* | 5/2008 | Onishi | H04N 1/0044 358/488 |
| 2011/0292457 A1* | 12/2011 | Miyata | H04N 1/00801 358/406 |
| 2017/0155787 A1* | 6/2017 | Mizude | H04N 1/38 |
| 2018/0077309 A1* | 3/2018 | Saitoh | H04N 1/3873 |
| 2018/0225541 A1* | 8/2018 | Kobayashi | G06K 9/4633 |
| 2020/0028985 A1* | 1/2020 | Tagami | H04N 1/3878 |

FOREIGN PATENT DOCUMENTS

JP 2017-201767 11/2017

\* cited by examiner

*Primary Examiner* — Cheukfan Lee
(74) *Attorney, Agent, or Firm* — Lex IP Meister, PLLC

(57) ABSTRACT

An image reading apparatus includes a reading processing unit that acquires image data including an image of a document placed on a document placement unit. A first detection processing unit detects a first line image whose width or density exceeds a predetermined first threshold value from the image data. A second detection processing unit detects a rectangular area that is defined by the first line image, included in the image data, and satisfies a predetermined detection condition. A third detection processing unit detects a second line image whose width or density exceeds a second threshold value smaller than the first threshold value from the rectangular area. A fourth detection processing unit detects, as document areas of the respective documents, the rectangular area not divided by the second line image and divided areas included in the rectangular area divided by the second line image.

7 Claims, 5 Drawing Sheets

IMAGE READING APPARATUS, IMAGE FORMING APPARATUS, AND DOCUMENT AREA DETECTION METHOD

INCORPORATION BY REFERENCE

This application is based upon and claims the benefit of priority from the corresponding Japanese Patent Application No. 2020-030083 filed on Feb. 26, 2020, the entire contents of which are incorporated herein by reference.

BACKGROUND

The present disclosure relates to an image reading apparatus, an image forming apparatus, and a document area detection method.

There is known an image reading apparatus capable of acquiring image data of a document placed on a document placement unit such as a contact glass and detecting a document area included in the acquired image data. For example, in this type of image reading apparatus, a line image having a width exceeding a predetermined threshold value is detected from acquired image data. Then, based on the detected line image, a shadow image indicating a shadow generated on the outer periphery of the document when the image included in the acquired image data is read is detected, and an area inside the shadow image is detected as a document area.

In the image reading apparatus, image data of a plurality of documents spread and placed on the document placement unit may be acquired, and a plurality of document areas included in the acquired image data may be detected. Here, in a case where edge portions facing each other of two documents adjacent to each other on the document placing portion stick to each other without a gap, detection of the shadow image of the stuck portion fails, and the number of document areas to be detected may be smaller than the number of documents placed on the document placement unit. On the other hand, in order to increase the detection sensitivity of the shadow image, it is conceivable to decrease the threshold value. However, when the threshold value is lowered and the line image is detected from the acquired image data, the detection processing of the shadow image based on the detection result becomes complicated, and the processing load of the apparatus increases.

SUMMARY

An image reading apparatus according to this disclosure includes a reading processing unit, a first detection processing unit, a second detection processing unit, a third detection processing unit and a fourth detection processing unit. The reading processing unit acquires image data including an image of a document placed on a document placement unit. The first detection processing unit detects a first line image whose width or density exceeds a predetermined first threshold value from the image data. The second detection processing unit detects a rectangular area that is defined by the first line image, included in the image data, and satisfies a predetermined detection condition. The third detection processing unit detects a second line image whose width or density exceeds a second threshold value smaller than the first threshold value from the rectangular area. The fourth detection processing unit detects, as document areas of the respective documents, the rectangular area not divided by the second line image and divided areas included in the rectangular area divided by the second line image.

An image forming apparatus according to this disclosure includes the image reading apparatus and an image forming unit that forms an image based on image data acquired by the image reading apparatus.

A document area detection method according to this disclosure includes: acquiring image data including an image of a document placed on a document placement unit; detecting a first line image whose width or density exceeds a predetermined first threshold value from the image data; detecting a rectangular area that is defined by the first line image, included in the image data, and satisfies a predetermined detection condition; detecting a second line image whose width or density exceeds a second threshold value smaller than the first threshold value from the rectangular area; and detecting, as document areas of the respective documents, the rectangular area not divided by the second line image and divided areas included in the rectangular area divided by the second line image.

DETAILED DESCRIPTION

Hereinafter, embodiments of the present disclosure will be described with reference to the accompanying drawings. It should be noted that the following embodiment is a specific example of the present disclosure and does not limit the technical scope of the present disclosure.

[Configuration of Image Forming Apparatus 10]

Figure 1:
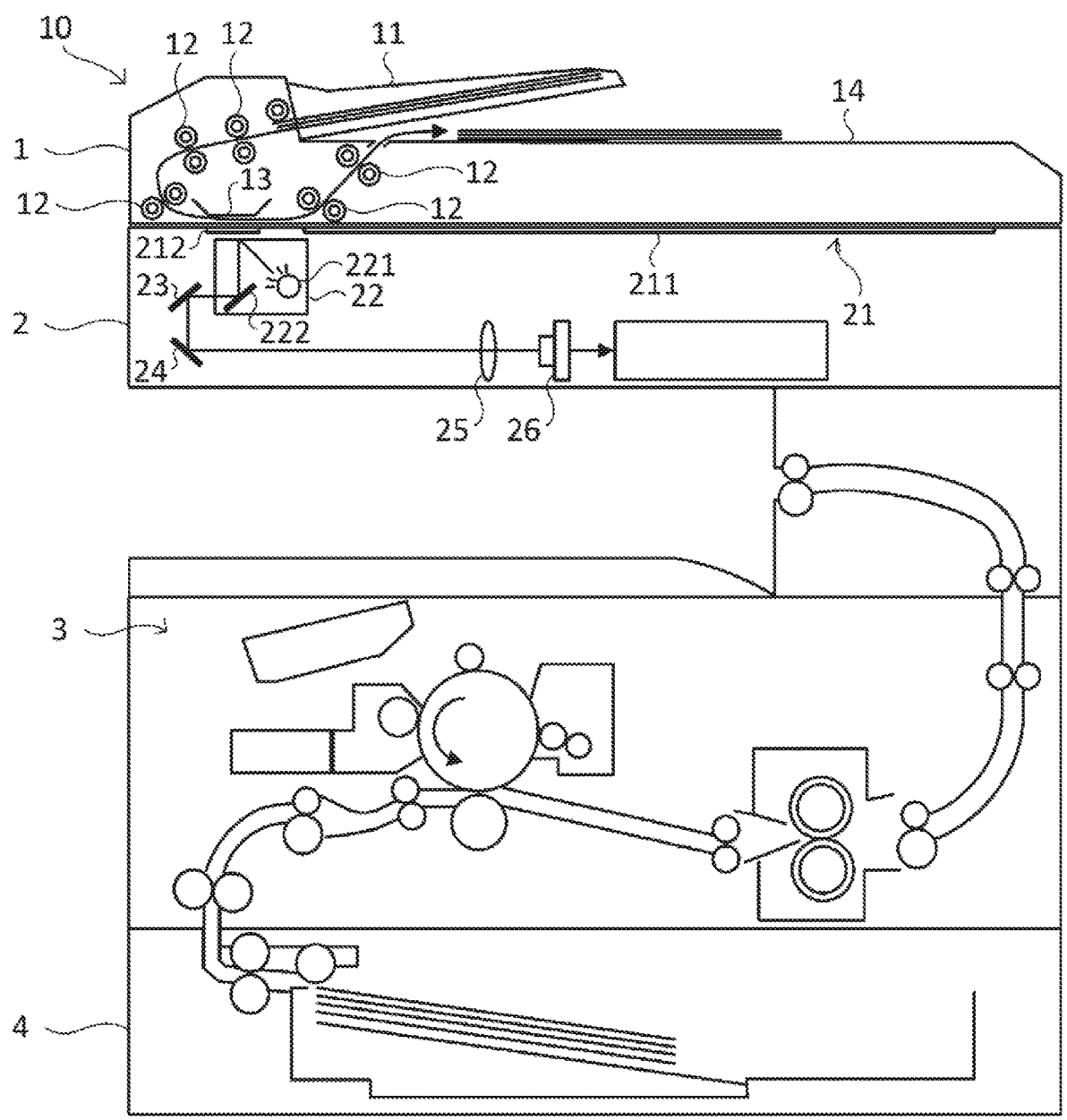
FIG. 1 is a diagram showing a configuration of an image forming apparatus according to an embodiment of the present disclosure.
Figure 2:
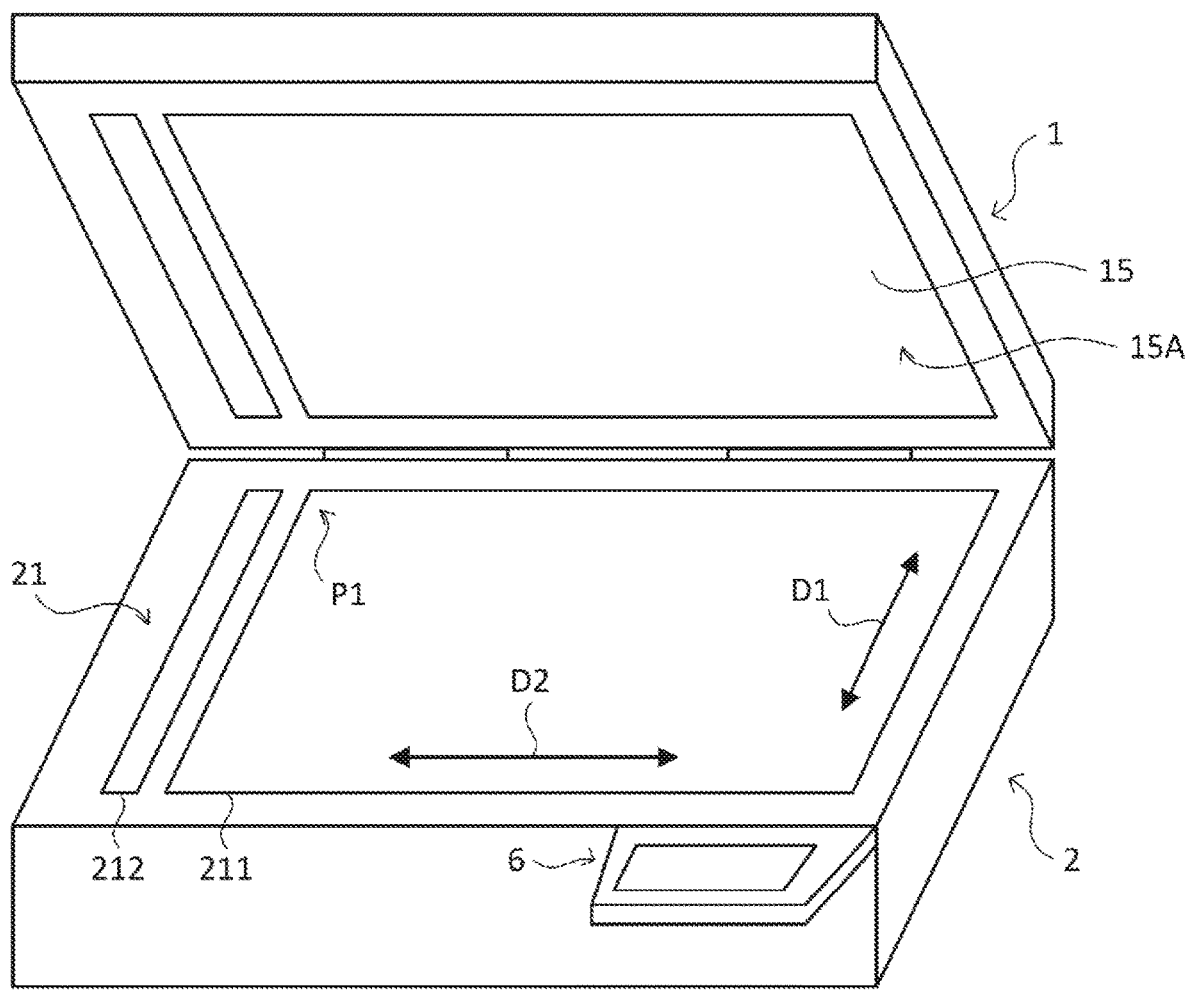
FIG. 2 is a diagram showing a configuration of an ADF and an image reading unit of the image forming apparatus according to the embodiment of the present disclosure.

First, a configuration of an image forming apparatus 10 according to an embodiment of the present disclosure will be described with reference to FIGS. 1 to 3. FIG. 1 is a cross section view illustrating a configuration of the image forming apparatus 10. FIG. 2 is a perspective view showing a state in which a ADF1 is opened.

The image forming apparatus 10 is a multifunction peripheral having a plurality of functions such as a scan function of acquiring image data from a document, a print function of forming an image based on the image data, a facsimile function, and a copy function. The image forming apparatus 10 may be a copier.

Figure 3:
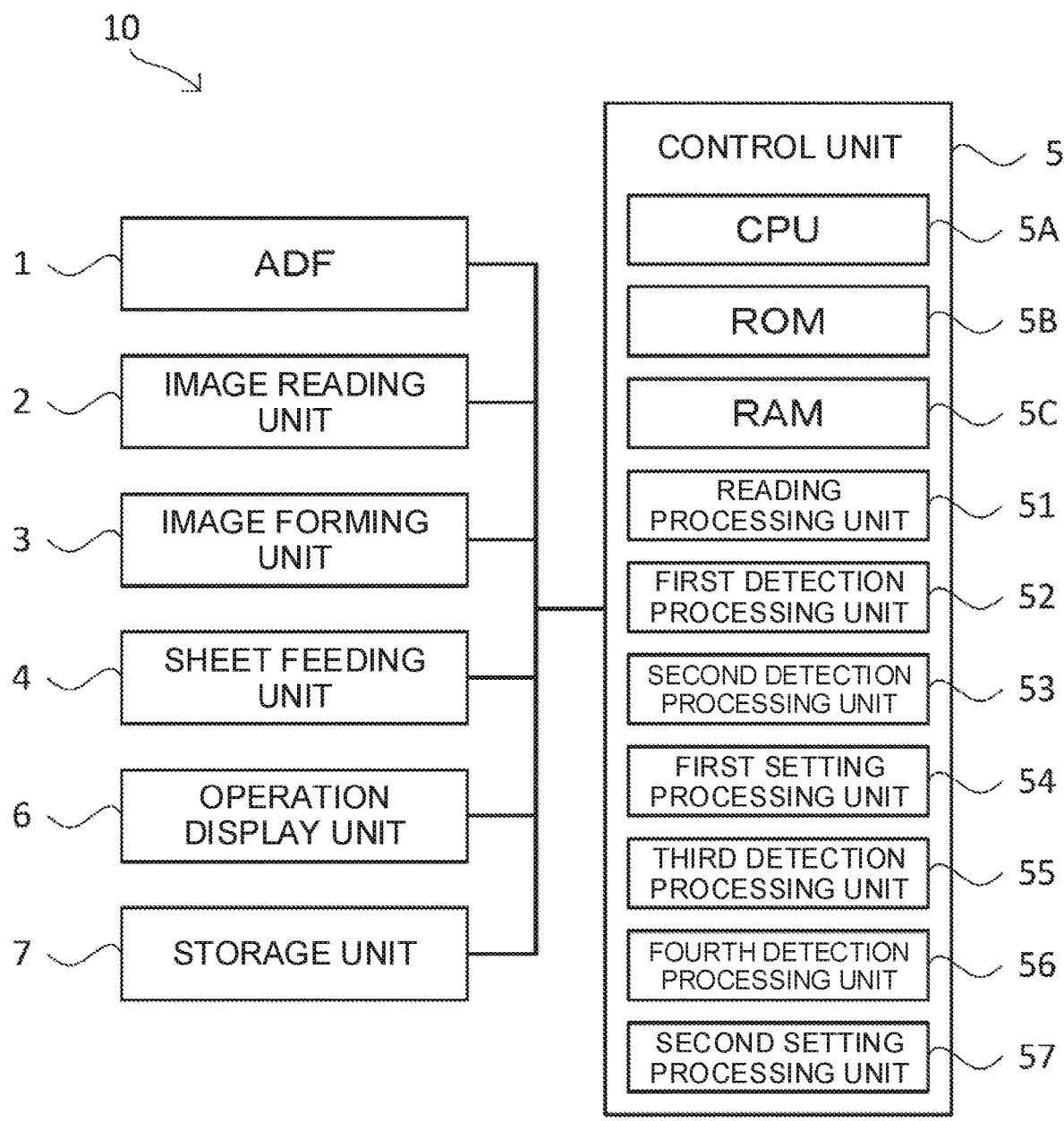
FIG. 3 is a block diagram showing a system configuration of the image forming apparatus according to the embodiment of the present disclosure.

As illustrated in FIGS. 1 and 3, the image forming apparatus 10 includes an automatic document feeder (ADF) 1, an image reading unit 2, an image forming unit 3, a sheet feeding unit 4, a control unit 5, an operation display unit 6, and a storage unit 7.

The image forming unit 3 can form an image on a sheet by an electro-photographic method based on image data acquired by the image reading unit 2. The image forming unit 3 includes a photosensitive drum, a charging roller, an optical scanning device, a developing device, a transfer roller, a cleaning device, a fixing device, and a sheet discharge tray. The image forming unit 3 may form an image by another image forming method such as an inkjet method.

The sheet feeding unit 4 feeds a sheet to the image forming unit 3. The sheet feeding unit 4 includes a sheet feeding cassette and a plurality of conveyance rollers.

The control unit 5 comprehensively controls the image forming apparatus 10. As shown in FIG. 3, the control unit 5 includes a CPU 5A, ROM 5B and a RAM 5C. The CPU 5A is a processor that executes various types of arithmetic processing. The ROM 5B is a non-volatile storage device in which information such as a control program for causing the CPU 5A to process is stored in advance. The RAM 5C is a volatile storage device used as a temporary storage memory (work area) for various processes executed by the CPU 5A. In the control unit 5, various control programs stored in advance in the ROM 5B are executed by the CPU 5A. Thus, the image forming apparatus 10 is comprehensively controlled by the control unit 5. The control unit 5 may be configured by an electronic circuit such as an integrated circuit (ASIC). Further, the control unit 5 may be a control unit provided separately from a main control unit that comprehensively controls the image forming apparatus 10.

The operation display unit 6 is a user interface of the image forming apparatus 10. The operation display unit 6 includes a display unit such as a liquid crystal display that displays various types of information according to a control instruction from the control unit 5, and an operation unit such as an operation key or a touch panel that inputs various types of information to the control unit 5 according to a user operation.

The storage unit 7 is a nonvolatile storage device. For example, the storage unit 7 is a storage device such as a nonvolatile memory such as a flash memory or an EEPROM (R), a solid state drive (SSD), or a hard disk drive (HDD).

The ADF1 conveys a document whose image data is to be acquired by the image reading unit 2. As illustrated in FIG. 1, the ADF1 includes a document tray 11, a plurality of conveyance rollers 12, a document guide 13, and a sheet discharge unit 14.

In the ADF1, each of the conveyance rollers 12 is driven by a motor (not shown). Thus, the document placed on the document tray 11 is conveyed along the document conveyance path formed inside the ADF1. The document conveyed along the document conveyance path is guided onto the second contact glass 212 of the document table 21 (see FIG. 1) by the document guide 13, and then discharged to the discharge unit 14.

The image reading unit 2 can read an image from a document and acquire image data including the image. Specifically, the image reading unit 2 can acquire image data from a document by a charge coupled device (CCD) method. As illustrated in FIGS. 1 and 2, the image reading unit 2 includes a document table 21, a reading unit 22, a mirror 23, a mirror 24, an optical lens 25, and a CCD26.

The document table 21 is provided on an upper surface of a box-shaped housing that houses components of the image reading unit 2. As shown in FIGS. 1 and 2, the document table 21 includes a first contact glass 211 and a second contact glass 212. The first contact glass 211 is a glass formed in a flat plate shape, and a document is placed on an upper surface thereof. In the image forming apparatus 10, documents of various sizes are placed on the first contact glass 211 in accordance with the placement reference position P1 shown in FIG. 2. A plurality of documents are spread and placed on the first contact glass 211. The second contact glass 212 transmits light emitted from the reading unit 22 toward the document conveyed by the ADF1. Here, the first contact glass 211 is an example of a document placement unit in the present disclosure.

As shown in FIG. 2, on the surface of the document table 21, an ADF1 is attached to the first contact glass 211 so as to be openable and closable. Thus, the ADF1 functions as a document cover for a document placed on the first contact glass 211. A pressing plate 15 is provided on the bottom surface of the ADF1. The pressing plate 15 has a pressing surface 15A that presses the upper surface of the document placed on the first contact glass 211 against the first contact glass 211 in a state where the ADF1 is closed. The entire pressing surface 15A is covered with a white solid image. In other words, a white solid image is formed on the entire pressing surface 15A. The pressing surface 15A may be partially or entirely covered with an image of a color different from white.

As shown in FIG. 1, the reading unit 22 is provided below the first contact glass 211 and the second contact glass 212. The reading unit 22 is movable in a sub-scanning direction D2 illustrated in FIG. 2 by a moving mechanism (not illustrated) including a driving unit such as a stepper motor. As shown in FIG. 1, the reading unit 22 includes a light source 221 and a mirror 222.

The light source 221 is a plurality of LEDs arranged along the main scanning direction D1 shown in FIG. 2. The light source 221 irradiates the first contact glass 211 or the second contact glass 212 with light for one line in the main scanning direction D1. The light emitted from the light source 221 passes through the first contact glass 211 or the second contact glass 212, and is applied to the document placed on the first contact glass 211 or the document conveyed by the ADF1. The mirror 222 reflects the light emitted from the light source 221 and reflected by the document to the mirror 23.

In the image reading section 2, when the image data is obtained from the document placed on the first contact glass 211, the reading unit 22 is moved in the sub-scanning direction D2 by the moving mechanism. Thus, light emitted from the light source 221 to the document is scanned in the sub-scanning direction D2. In the image reading section 2, the reading unit 22 is moved to a position below the second contact glass 212 by the moving mechanism when the image data is obtained from the document conveyed by the ADF1. As a result, light emitted from the light source 221 passes through the second contact glass 212 and is applied to the document conveyed by the ADF1.

The mirror 23 reflects the light reflected by the mirror 222 of the reading unit 22 to the mirror 24. The mirror 24 reflects the light reflected by the mirror 23 to the optical lens 25. The optical lens 25 condenses the light reflected by the mirror 24 and makes the light incident on the CCD26.

The CCD26 is an image sensor having a plurality of photoelectric conversion elements arranged along the main scanning direction D1. The CCD26 outputs an electrical signal corresponding to the amount of received light. In the image reading unit 2, light emitted from the light source 221 and reflected by the document is incident on the CCD26 via the mirror 222, the mirror 23, the mirror 24, and the optical lens 25. Thus, an analog electric signal corresponding to the image of the document is output from the CCD26. An analog electric signal output from the CCD26 is converted into a digital electric signal (image signal) by an AFE (analog front end) circuit (not shown), and is input to the control unit 5.

The image reading unit 2 may acquire image data from a document by a contact image sensor (CIS) method.

An image reading apparatus acquiring image data of a document placed on the first contact glass 211 and detecting a document area included in the acquired image data is known. For example, in this type of image reading apparatus, a line image having a width exceeding a predetermined threshold value is detected from acquired image data. Then, based on the detected line image, a shadow image indicating a shadow generated on the outer periphery of the document when the image included in the acquired image data is read is detected, and an area inside the shadow image is detected as a document area.

Figure 5:
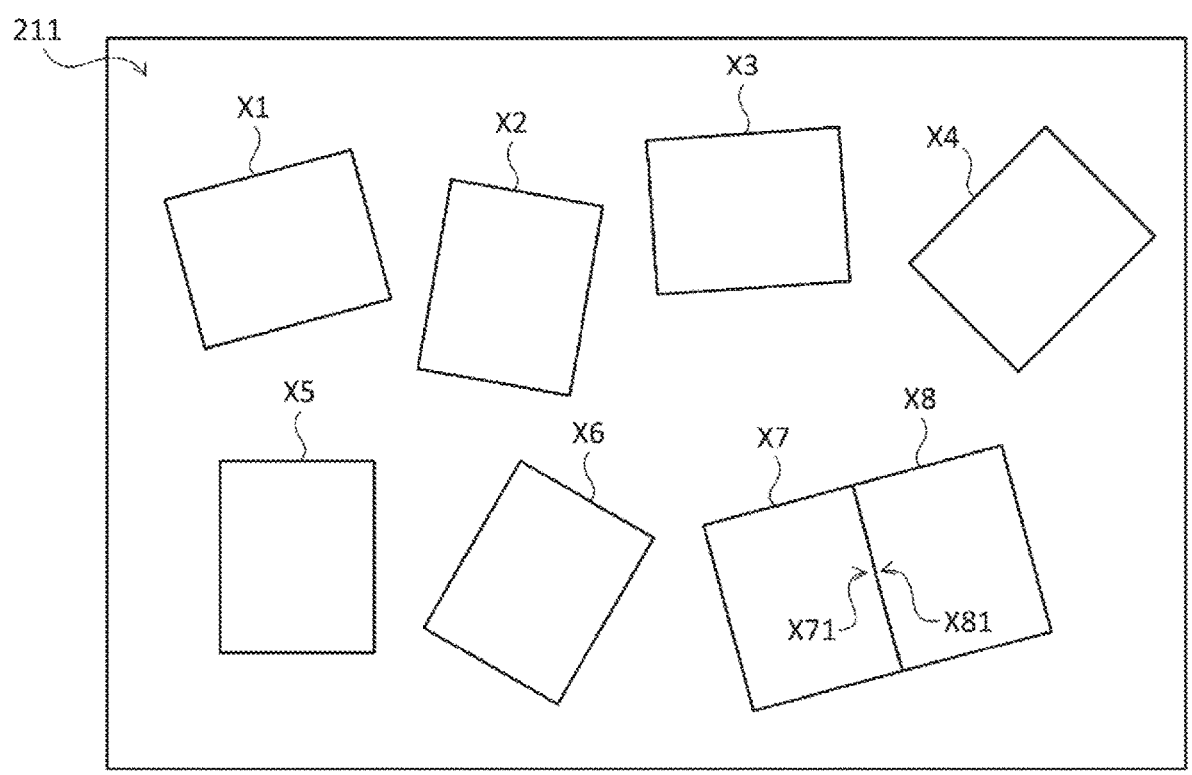
FIG. 5 is a view showing an example of a plurality of documents spread and placed on the first contact glass of the image forming apparatus according to the embodiment of the present disclosure.

Here, in the image reading apparatus, as shown in FIG. 5, image data of a plurality of documents X1 to X8 spread and placed on the first contact glass 211 may be acquired, and a plurality of document areas included in the acquired image data may be detected. Here, like the document X7 and the document X8 shown in FIG. 5, when mutually opposing edge portions of two adjacent documents on the first contact glass 211 (see the edge portion X71 of the document X7 and the edge portion X81 of the document X8 in FIG. 5) stick to each other without gaps, detection of the shadow image of the stuck portion fails, and the number of detected document areas may be smaller than the number of documents placed on the first contact glass 211. That is, the document X7 and the document X8 shown in FIG. 5 may be recognized as one document. On the other hand, in order to increase the detection sensitivity of the shadow image, it is conceivable to decrease the threshold value. However, when the threshold value is lowered and the line image is detected from the acquired image data, the detection processing of the shadow image based on the detection result becomes complicated, and the processing load of the apparatus increases.

On the other hand, as described below, the image forming apparatus 10 according to the embodiment of the present disclosure suppresses an increase in the processing load of the apparatus and improve the detection accuracy of a plurality of document areas included in image data.

Concretely, in the ROM 5B of the control unit 5, a document area detection program for causing the CPU 5A to execute a document area detection process described later (see the flowchart of FIG. 4) is stored in advance. The document area detection program may be recorded in a computer-readable recording medium such as a CD, DVD or a flash memory, read from the recording medium, and installed in the storage unit 7.

As shown in FIG. 3, the control unit 5 includes a reading processing unit 51, a first detection processing unit 52, a second detection processing unit 53, a first setting processing unit 54, a third detection processing unit 55, a fourth detection processing unit 56, and a second setting processing unit 57. Concretely, the control unit 5 executes the document area detection program stored in ROM 5B using CPU 5A. Accordingly, the control unit 5 functions as a reading processing unit 51, a first detection processing unit 52, a second detection processing unit 53, a first setting processing unit 54, a third detection processing unit 55, a fourth detection processing unit 56, and a second setting processing unit 57. Here, an apparatus including the image reading unit 2 and the control unit 5 is an example of an image reading apparatus in the present disclosure.

The reading processing unit 51 executes a reading process of acquiring image data of image including an image of a document placed on the first contact glass 211.

For example, the reading processing unit 51 executes the reading process when an instruction to execute the reading process is input by a user operation on the operation display unit 6. In the reading process, the operation of each unit of the image reading unit 2 is controlled, and image data is acquired from the upper surface of the first contact glass 211. In the following description, it is assumed that image data including an image of each of a plurality of documents spread and placed on the first contact glass 211 is acquired in the reading process.

A first detection processing unit 52 detects a first line image whose width exceeds a preset first threshold value from image data acquired by the reading processing.

Here, the first line image is a line image of a predetermined color such as black or dark gray. The first line image may be detected by a conventionally known method.

The second detection processing portion 53 detects a rectangular region which is included in the image data acquired in the reading process, is defined by the first line image detected by the first detection processing unit 52, and satisfies a predetermined detection condition. Here, in the image forming apparatus 10, the first line image defining the rectangular region satisfying the detection condition is handled as the shadow image.

For example, the detection condition is that an outside of a boundary line by the first line image is not surrounded by the first line image, and a size of an area defined by the first line image exceeds a predetermined lower limit size. For example, the lower limit size is slightly smaller than the size (85.60 mm in width and 53.98 mm in length) according to ID-1 of ISO/IEC7810. The lower limit size may be arbitrarily set in accordance with a user operation on the operation display unit 6. The detection condition may be that an outside of a boundary line of the first line image is not surrounded by the first line image.

When the second detection processing unit 53 detects a plurality of rectangular regions, the first setting processing unit 54 sets an average value of sizes of the plurality of rectangular regions included in the image data acquired by the reading process as a reference size.

The first setting processing unit 54 may set, as the reference size, the size of the rectangular area having the smallest size among the plurality of rectangular areas included in the image data acquired by the reading process.

The third detection processing unit 55 detects a second line image whose width exceeds a second threshold value smaller than the first threshold value from a specific rectangular area whose size exceeds the reference size set by the first setting processing unit 54 among the rectangular areas detected by the second detection processing unit 53. That is, the third detection processing unit 55 does not detect the second line image from outside the specific rectangular area.

The second line image is a line image that is a linear image of a predetermined color such as black or dark gray like the first line image. As a method of detecting the second line image, a conventionally known method may be used.

The control unit 5 may not include the first setting processing unit 54. In this case, the reference size may or may not be registered in advance in the image forming apparatus 10. When the reference size is not registered, the third detection processing unit 55 may detect the second line image from each of the rectangular areas detected by the second detection processing unit 53.

The fourth detection processing unit 56 detects the rectangular area that is not divided by the second line image and divided areas included in the rectangular region that is divided by the second line image, as document areas of each document.

The second setting processing unit 57 sets the first threshold value and the second threshold value in accordance with a designation operation for designating the type of the document.

For example, in the image forming apparatus 10, table data in which a combination of a document type, a first numerical value that is a candidate for the first threshold value, and a second numerical value that is a candidate for the second threshold value is associated is stored in advance in the storage unit 7. Here, the type of the document is, for example, plain paper, thick paper, thin paper, high quality paper, or the like. For example, the first numerical value corresponding to plain paper is determined based on the width of the shadow image included in image data acquired from plain paper. Further, the second numerical value corresponding to the plain paper is determined based on the width of the shadow image corresponding to the portion where the two plain papers are adhered to each other, which is included in the image data obtained from the two plain papers in which the edge portions facing each other are adhered to each other without gaps, such as the document X7 and the document X8 shown in FIG. 5.

For example, when an instruction to execute the reading process is input by a user operation on the operation display unit 6, the second setting processing unit 57 causes the operation display unit 6 to display a designation screen on which the designation operation can be performed before the reading process is executed. When the designation operation is performed on the designation screen, the second setting processing unit 57 sets the first numerical value and the second numerical value associated with the type of the document designated by the designation operation as the first threshold value and the second threshold value, respectively. The reading processing unit 51 executes the reading processing after the second setting processing unit 57 sets the first threshold value and the second threshold value.

The designation operation may be an operation of designating the thickness of the document. In this case, the table data may be data in which the thickness of the document is associated with a combination of the first numerical value and the second numerical value.

The control unit 5 may not include the second setting processing unit 57. In this case, the first threshold value and the second threshold value may be registered in advance in the image forming apparatus 10. Further, the first threshold value and the second threshold value may be arbitrarily set by a user's operation on the operation display unit 6.

In addition, the size of the document to be read may be set on the designation screen. In this case, the first setting processing portion 54 may set the size of the document set on the designation screen as the reference size.

[Document Area Detection Process]

Figure 4:
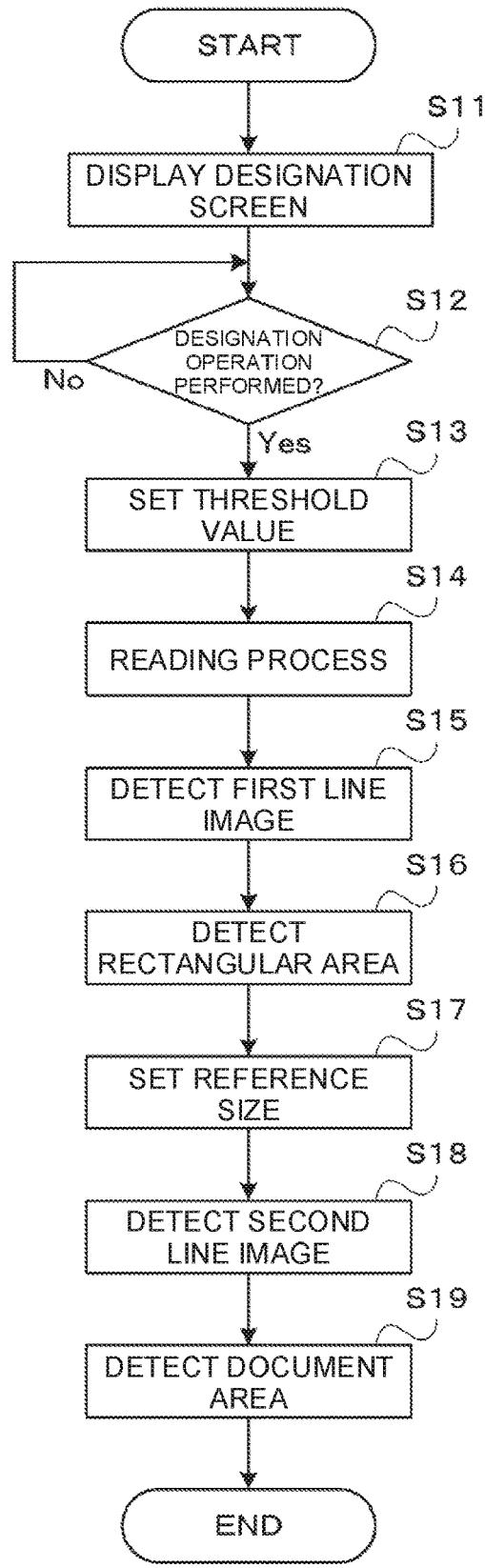
FIG. 4 is a flowchart showing an example of document area detection processing executed by the image forming apparatus according to the embodiment of the present disclosure.

Hereinafter, an example of a procedure of the document area detection process executed by the control unit 5 in the image forming apparatus 10 will be described with reference to FIG. 4. Here, the steps S11, S12, . . . represent numbers of processing procedures (steps) executed by the control unit 5. The document area detection process is executed when an instruction to execute the reading process is input.

<Step S11>

First, in step S11, the control unit 5 causes the operation display unit 6 to display the designation screen.

<Step S12>

In step S12, the control unit 5 determines whether or not the designation operation has been performed on the designation screen displayed in step S11.

When the control unit 5 determines that the designation operation has been performed (Yes side of S12), the control unit 5 shifts the process to step S13. If the designation operation is not performed (No side of S12), the control unit 5 waits for the designation operation to be performed in step S12.

<Step S13>

In step S13, the control unit 5 sets the first numerical value and the second numerical value associated, in the table data, with the type of the document designated in step S12 as the first threshold value and the second threshold value, respectively. Here, the processing from step S11 to step S13 is executed by the second setting processing unit 57 of the control unit 5.

<Step S14>

In step S14, the control unit 5 executes the reading process. Here, the process of step S14 is executed by the reading processing unit 51 of the control unit 5.

<Step S15>

In step S15, the control unit 5 detects the first line image from the image acquired in step S14. Here, the process of step S15 is executed by the first detection processing unit 52 of the control unit 5.

<Step S16>

In step S16, the control unit 5 detects the rectangular area included in the image data acquired in step S14. Here, the process of step S16 is executed by the second detection processing unit 53 of the control unit 5.

<Step S17>

In step S17, the control unit 5 sets an average value of the sizes of the plurality of rectangular areas detected in step S16 as the reference size. Here, the process of step S17 is executed by the first setting processing unit 54 of the control unit 5.

When the number of rectangular areas detected in the step S16 is one, the control unit 5 may omit the step S17 processing.

<Step S18>

In step S18, the control unit 5 detects the second line image from the specific rectangular area whose size exceeds the reference size set in step S17 among the rectangular areas detected in step S16. Here, the process of step S18 is executed by the third detection processing unit 55 of the control unit 5.

<Step S19>

In step S19, the control unit 5 detects the rectangular area that is not divided by the second line image detected in step S18 and the divided areas included in the rectangular area that is divided by the second line image, as document areas of the respective documents. Here, the process of step S19 is executed by the fourth detection processing unit 56 of the control unit 5.

After the execution of the document area detection processing, the control unit 5 executes cropping processing in which each of the document areas detected by the document area detection processing is cut out from the image data acquired by the reading processing, and each of the cut-out document areas is set as one image.

As described above, in the image forming apparatus 10, the second line image whose width exceeds the second threshold value smaller than the first threshold value is detected from the rectangular area detected using the first threshold value, and the rectangular area not divided by the second line image and the divided areas included in the rectangular area divided by the second line image are detected as the document area. Accordingly, compared to a configuration in which the second line image is detected from the acquired image data and the document area is detected based on the detection result, it is possible to suppress an increase in the processing load of the apparatus and improve the detection accuracy of the plurality of document areas included in the image data.

In addition, in the image forming apparatus 10, when a plurality of the rectangular areas are detected using the first threshold value, the second line image is detected from the specific rectangular area exceeding an average value of sizes of the plurality of rectangular areas, and the second line image is not detected from the other rectangular areas. Accordingly, compared to a configuration in which the second line image is detected from all of the rectangular areas, it is possible to reduce the processing load of the apparatus while suppressing a decrease in the detection accuracy of the document area.

Further, in the image forming apparatus 10, the first threshold value and the second threshold value are set in accordance with the type of the document designated in advance. This makes it possible to further improve the detection accuracy of the document area.

The first line image may be an image whose density exceeds a preset third threshold value (another example of the first threshold value of the present disclosure). The second line image may be an image whose density exceeds a fourth threshold value (another example of the second threshold value of the present disclosure) smaller than the third threshold value.

What is claimed is:

1. An image reading apparatus comprising:
   a reading processing unit that acquires image data including an image of a document placed on a document placement unit;
   a first detection processing unit that detects a first line image whose width or density exceeds a predetermined first threshold value from the image data;
   a second detection processing unit that detects a rectangular area that is defined by the first line image, included in the image data, and satisfies a predetermined detection condition;
   a third detection processing unit that detects a second line image whose width or density exceeds a second threshold value smaller than the first threshold value from the rectangular area; and
   a fourth detection processing unit that detects, as document areas of the respective documents, the rectangular area not divided by the second line image and divided areas included in the rectangular area divided by the second line image.

2. The image reading apparatus according to claim 1, wherein the detection condition includes that an outside of a boundary line of the first line image is not surrounded by the first line image.

3. The image reading apparatus according to claim 1, wherein the third detection processing unit detects the second line image from a specific rectangular area whose size exceeds a predetermined reference size among the rectangular areas included in the image data.

4. The image reading apparatus according to claim 3, comprising a first setting processing unit that sets an average value of sizes of the plurality of rectangular areas included in the image data, as the reference size.

5. The image reading apparatus according to claim 1, comprising a second setting processing unit that sets the first threshold value and the second threshold value in accordance with a designation operation of designating a type of the document.

6. An image forming apparatus comprising:
   the image reading apparatus according to claim 1; and
   an image forming unit that forms an image based on image data acquired by the image reading apparatus.

7. A document area detection method comprising:
   acquiring image data including an image of a document placed on a document placement unit;
   detecting a first line image whose width or density exceeds a predetermined first threshold value from the image data;
   detecting a rectangular area that is defined by the first line image, included in the image data, and satisfies a predetermined detection condition;
   detecting a second line image whose width or density exceeds a second threshold value smaller than the first threshold value from the rectangular area; and
   detecting, as document areas of the respective documents, the rectangular area not divided by the second line image and divided areas included in the rectangular area divided by the second line image.

* * * * *